United States Patent
Thannheimer et al.

(10) Patent No.: US 10,661,641 B2
(45) Date of Patent: May 26, 2020

(54) COVER OF A VEHICLE ROOF HAVING A LIGHTING DEVICE

(71) Applicant: Webasto SE, Stockdorf (DE)

(72) Inventors: Johannes Thannheimer, Stockdorf (DE); Steffen Lorenz, Stockdorf (DE); Hubert Böhm, Stockdorf (DE); Thomas Schütt, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 27 days.

(21) Appl. No.: 15/542,040

(22) PCT Filed: Nov. 26, 2015

(86) PCT No.: PCT/EP2015/077847
§ 371 (c)(1),
(2) Date: Jul. 6, 2017

(87) PCT Pub. No.: WO2016/113027
PCT Pub. Date: Jul. 21, 2016

(65) Prior Publication Data
US 2018/0001751 A1    Jan. 4, 2018

(30) Foreign Application Priority Data
Jan. 12, 2015    (DE) .................. 10 2015 000 071

(51) Int. Cl.
*B60J 7/043*    (2006.01)
*B60Q 3/208*    (2017.01)
(Continued)

(52) U.S. Cl.
CPC ......... *B60J 7/043* (2013.01); *B32B 17/10018* (2013.01); *B32B 17/10541* (2013.01);
(Continued)

(58) Field of Classification Search
CPC . B60J 7/043-0435; B60J 1/2094; B60Q 3/52; B60Q 3/208; G02B 6/0095; G02B 6/0081-0093
See application file for complete search history.

(56) References Cited

U.S. PATENT DOCUMENTS

| | | | |
|---|---|---|---|
| 6,908,147 B2 | 6/2005 | Teschner | |
| 7,360,306 B2* | 4/2008 | Boehm | B32B 17/10018 29/832 |

(Continued)

FOREIGN PATENT DOCUMENTS

| | | | |
|---|---|---|---|
| DE | 198 52 593 A1 | 5/2000 | |
| DE | 103 13 067 A1 | 10/2004 | |

(Continued)

OTHER PUBLICATIONS

International Preliminary Report on Patentability issued for PCT/EP2015/077847 dated Jul. 18, 2017.
(Continued)

*Primary Examiner* — Mariceli Santiago
(74) *Attorney, Agent, or Firm* — Fitch, Even, Tabin & Flannery, LLP

(57) ABSTRACT

A cover for a vehicle roof, which may have a pane, an anti-splinter layer arranged on the inside face of the pane, and a lighting device having a luminous layer, wherein the luminous and anti-splinter layer forms both the anti-splinter layer and the luminous layer in this one layer and in particular the lighting device contains at least one luminous unit, which is designed to radiate light into the luminous and anti-splinter layer at a lateral edge region of the luminous and anti-splinter layer.

14 Claims, 13 Drawing Sheets

(51) Int. Cl.
*B60J 7/04* (2006.01)
*B60Q 3/54* (2017.01)
*B60Q 3/60* (2017.01)
*B32B 17/10* (2006.01)
*B62D 25/06* (2006.01)
*F21V 8/00* (2006.01)

(52) U.S. Cl.
CPC ............... *B60J 7/04* (2013.01); *B60Q 3/208* (2017.02); *B60Q 3/54* (2017.02); *B60Q 3/60* (2017.02); *B62D 25/06* (2013.01); *G02B 6/0046* (2013.01); *B60Q 2500/10* (2013.01)

(56) References Cited

U.S. PATENT DOCUMENTS

| | | | |
|---|---|---|---|
| 7,641,274 B2 | 1/2010 | Boehm et al. | |
| 8,944,655 B2* | 2/2015 | Verrat-Debailleul | B32B 17/10036 362/545 |
| 9,630,551 B2 | 4/2017 | Verrat-Debailleul et al. | |
| 2005/0001456 A1 | 1/2005 | Bohm et al. | |
| 2008/0150327 A1 | 6/2008 | Boehm et al. | |
| 2009/0148642 A1 | 6/2009 | Mauser et al. | |
| 2011/0267833 A1* | 11/2011 | Verrat-Debailleul | B32B 17/10036 362/545 |
| 2012/0320621 A1* | 12/2012 | Kleo | B32B 17/10018 362/558 |
| 2014/0002255 A1 | 1/2014 | Reuschel et al. | |
| 2014/0204601 A1* | 7/2014 | Bauerle | B60Q 1/268 362/511 |
| 2014/0362597 A1 | 12/2014 | Verrat-Debailleul et al. | |
| 2015/0078020 A1 | 3/2015 | Verrat et al. | |
| 2015/0247968 A1 | 9/2015 | Verrat-Debailleul et al. | |
| 2015/0251595 A1* | 9/2015 | Dellock | B60J 7/0007 362/510 |
| 2015/0298601 A1* | 10/2015 | Bott | B32B 17/10018 362/520 |

FOREIGN PATENT DOCUMENTS

| | | |
|---|---|---|
| DE | 10 2005 047656 A1 | 4/2007 |
| DE | 10 2008 004 942 A1 | 6/2009 |
| DE | 10 2011 014 263 A1 | 9/2011 |
| DE | 10 2012 109 900 A1 | 4/2014 |
| DE | 202009018915 U1 | 9/2014 |
| EP | 1080969 A2 | 3/2001 |
| EP | 1336520 A1 | 8/2003 |
| EP | 1493557 A1 | 1/2005 |
| EP | 1594692 A1 | 11/2005 |
| FR | 2 984 251 A1 | 6/2013 |
| FR | 2 989 041 A1 | 10/2013 |
| FR | 2 994 889 A1 | 3/2014 |
| WO | 2004073976 A1 | 9/2004 |

OTHER PUBLICATIONS

International Search Report for PCT/EP2015/077847 dated Feb. 17, 2016; English translation submitted herewith (10 pages).
Office Action issued against corresponding Chinese Patent Application No. 201580073051.X dated Apr. 29, 2019.

* cited by examiner

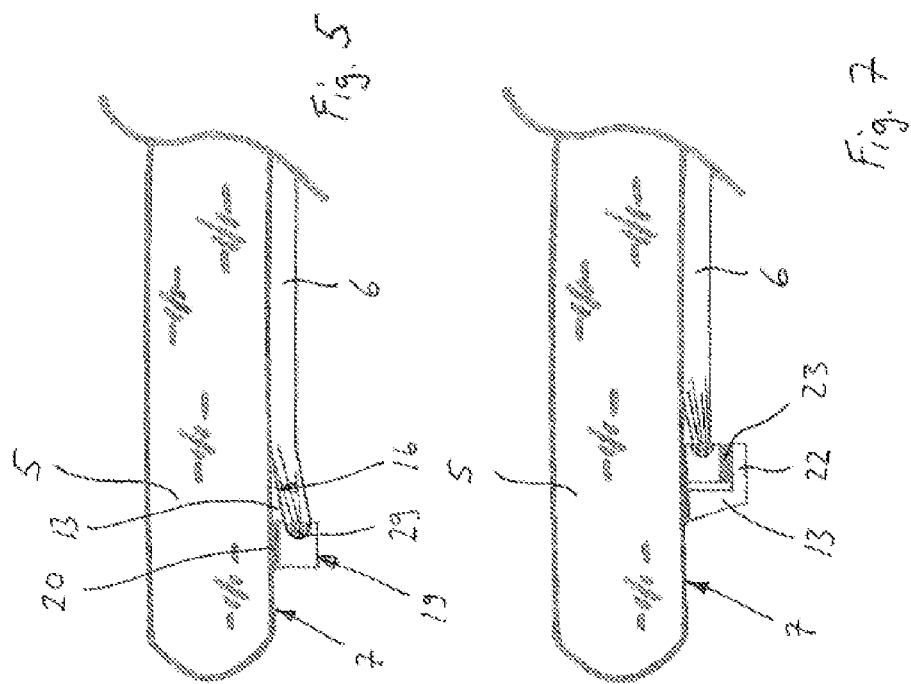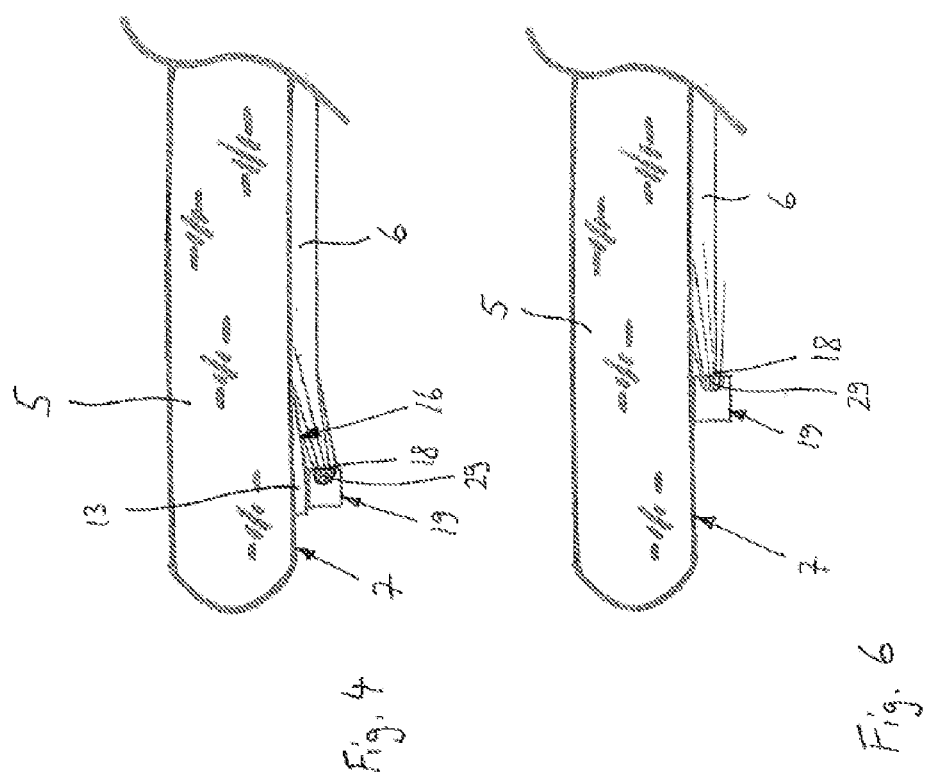

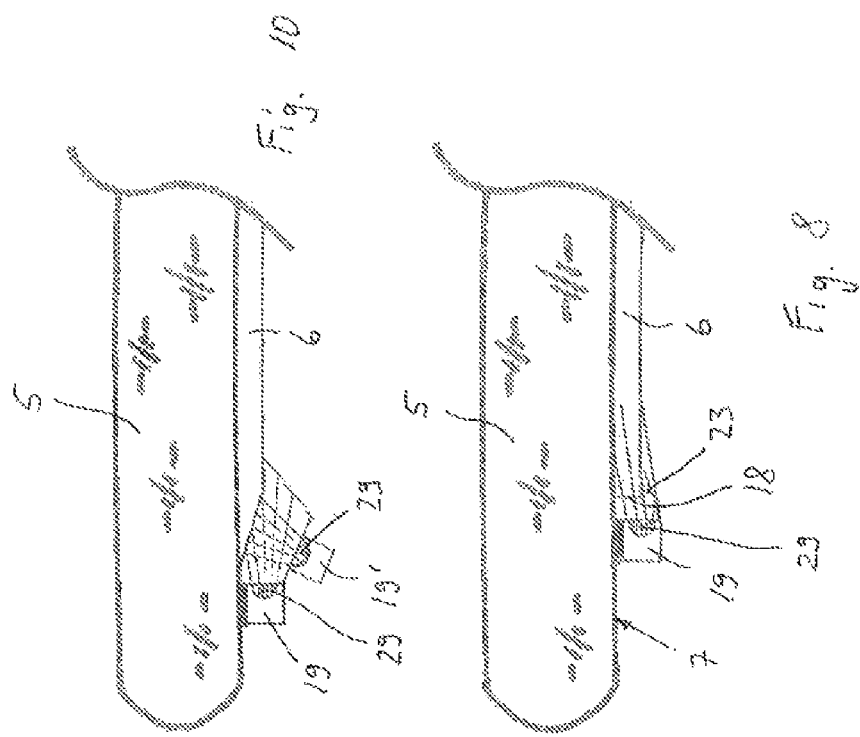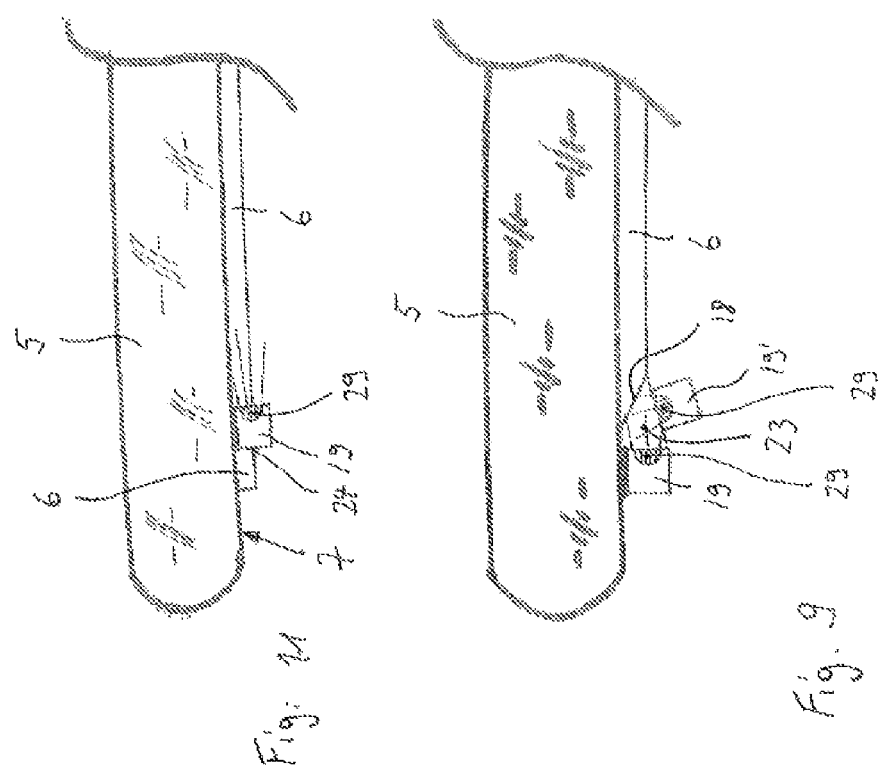

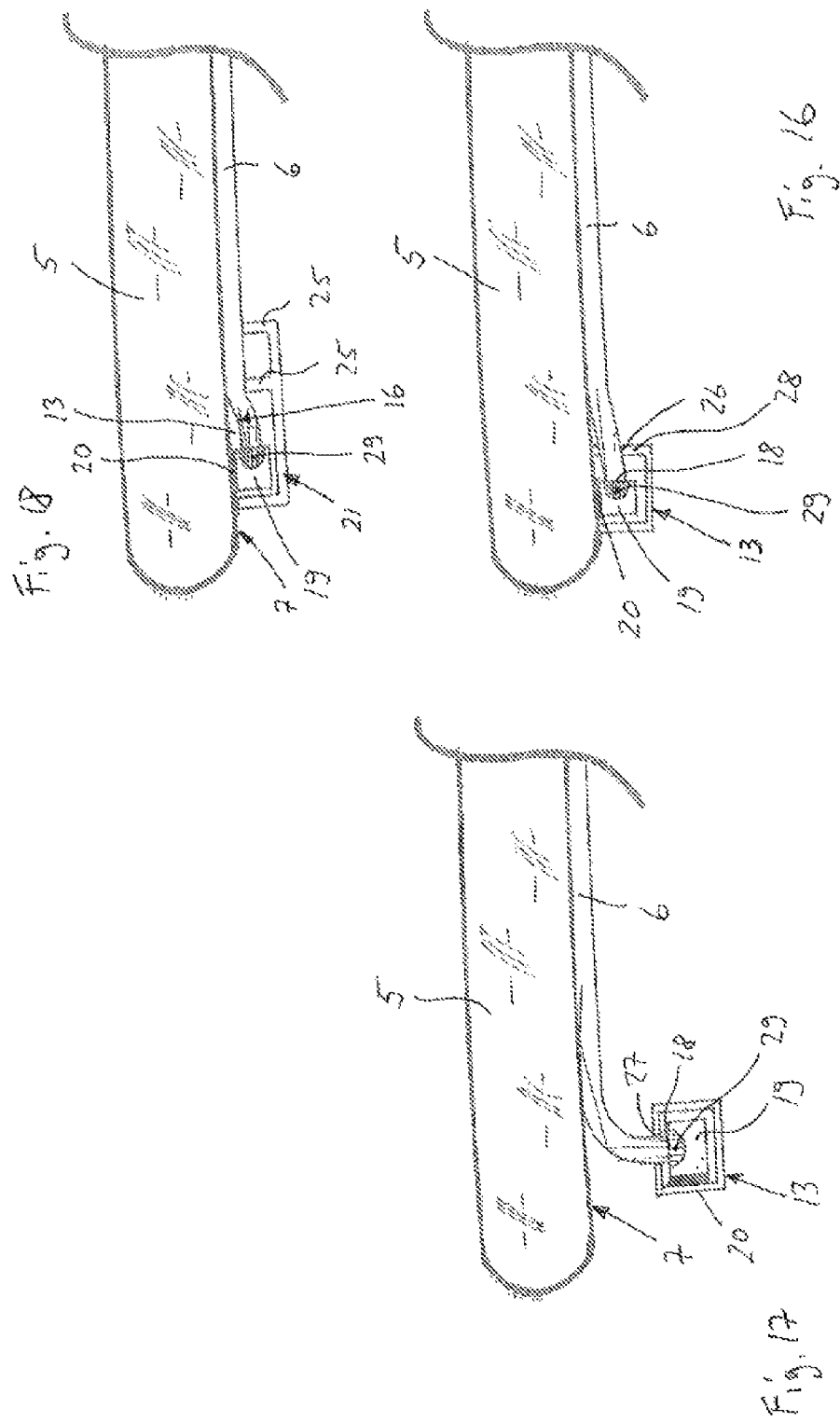

COVER OF A VEHICLE ROOF HAVING A LIGHTING DEVICE

CROSS-REFERENCE TO RELATED APPLICATIONS

This application is a U.S. national phase application filed under 35 U.S.C. § 371 of International Application No. PCT/EP2015/077847, filed Nov. 26, 2015, designating the United States, which claims priority from German Application No. 10 2015 000 071.3, filed Jan. 12, 2015, which are hereby incorporated herein by reference in their entirety for all purposes.

FIELD

The invention relates to a cover of a vehicle roof, which cover comprises a pane, an anti-splinter layer arranged on the inside face of the pane, and a lighting device comprising a luminous layer.

BACKGROUND

A cover of a vehicle roof is known from DE 10 2012 109 900 A1, which comprises a pane and a light-conducting layer connected in a firmly bonded manner to the inside face of the pane by a connection layer, into which light-conducting layer light can be radiated on the front side by a light source. The planar radiation of light from the light-conducting layer can take place by particles embedded in the light-conducting layer. The connection layer can serve as a laminated layer and it can also form an anti-splinter layer or an anti-splinter sheet.

SUMMARY

The invention is based on the problem of creating an initially cited cover which has an improved construction.

This problem is solved in the initially cited cover by the invention in that the anti-splinter layer and the luminous layer are formed by a luminous and anti-splinter layer.

Advantageous embodiments of the invention are indicated in the dependent claims.

The luminous and anti-splinter layer therefore forms both the luminous layer as well as the anti-splinter layer in this one layer. Since only this one luminous and anti-splinter layer is to be placed on the cover bottom, the manufacture of the cover is simplified in contrast to the known cover in which on the one hand the connection layer constituting the anti-splinter layer is attached on the inside face of the cover and on the other hand the light-conducting layer is placed as cover layer on the connection layer and the anti-splinter layer.

In a preferred design the luminous and anti-splinter layer has a thickness of approximately 0.15 mm to 0.75 mm and in particular approximately 0.2 mm to 0.5 mm and is formed in particular by a luminous anti-splinter sheet consisting of polyethylene terephthalate (PET) with a thickness of approximately 0.2 mm. However, even other plastic sheets are suitable which have an appropriate strength for splinter protection and the ability to conduct light and to radiate it from the layer, e.g., downward into the inner compartment of the vehicle.

The luminous and anti-splinter layer and the sheet or PET sheet are preferably applied in a laminating procedure at room temperature onto the pane. Such a laminating process is known, e.g., from DE 10 2007 003 173 A1. The luminous and anti-splinter layer and the sheet or PET sheet is advantageously formed on two opposing sides of the cover with openings or perforations. A PU foaming around the cover or an adhesive bead penetrates through the openings or perforations and additionally reinforces the fastening of the layer or sheet on a cover frame, inner metallic sheet of the cover or in the case of a fixed vitrification on the vehicle frame.

Therefore, the cover of the invention can be manufactured with a lower weight, lower costs and less construction space in the direction vertical to the cover and to the pane and with a laminating process that can be readily carried out.

The lighting device advantageously contains at least one luminous unit which is provided on a side edge area of the luminous and anti-splinter layer for radiating light into the luminous and anti-splinter layer. The luminous unit can contain in particular LEDs or micro-LEDs which are arranged on an inwardly radiating edge of the luminous and anti-splinter layer along the side edge area of the cover. The inwardly radiating edge of the luminous and anti-splinter layer is, e.g., a sectional border which can be aligned vertically or also obliquely to the luminous and anti-splinter layer. In particular, the luminous unit radiates light directly and immediately into the luminous and anti-splinter layer. Accordingly, there are no other light-conducting structural parts in the path of the light beam.

A preferred embodiment provides that at least one positioning strip is provided for the fastening of the luminous unit and/or for the association of the luminous unit to the irradiation edge of the luminous and anti-splinter layer. The positioning strip can be a flat, strip-shaped component, an open profile such as, e.g., a U-shaped profile or also a closed hollow profile. The positioning strip simplifies and improves the mounting of the luminous unit since it allows an optimized, mutual association. Such a longitudinal component is designated as positioning strip which positions, according to the shape and the cross-sectional form in a different manner, the luminous and anti-splinter layer and/or the luminous unit against one another and/or on the pane or the cover. The positioning strip is manufactured, e.g., from plastic.

The positioning strip is advantageously attached on the inside face of the cover, in particular adjacent to the cover edge. The luminous and anti-splinter layer is arranged against, on or in this positioning strip with its edge area containing the irradiation edge at a distance from the inside face of the pane. Therefore, the positioning strip can be provided only for the receiving of the luminous and anti-splinter layer whereas the luminous unit can be attached to the cover. On the other hand, the positioning strip can also be provided and constructed for receiving the luminous unit.

In a preferred design the positioning strip comprises an inner side or lower side with which it is arranged on the inside face of the cover and comprises an oppositely located outer side or top side for carrying the luminous and anti-splinter layer with its edge area containing the irradiation edge at a distance from the inside surface of the cover. In addition, the outer side or top side can comprise a curved or inclined transitional surface which runs out in the direction of the middle of the cover, e.g., in a wedge-shaped tip and forms a continuous fastening foundation for the luminous and anti-splinter layer.

If the positioning strip has a receiving section on which the luminous unit can be brought in association with the luminous and anti-splinter layer, then the luminous unit can readily assume its correct position. The receiving section therefore facilitates the mounting.

The receiving section is advantageously built as an offset which extends from the irradiation edge of the luminous and anti-splinter layer toward the cover edge and on which a or the luminous unit or LED luminous unit is arranged. The offset offers an additional mounting aid and can also reduce the construction space in the direction vertical to the cover or to the pane.

The luminous unit can comprise a flexible band or a guide plate with LEDs or micro-LEDs arranged on it. The luminous unit can be fastened by an adhesive layer or an adhesive band on the inside face of the cover or on a coating of the inside face of the cover or on the receiving section or on the offset of the positioning strip.

The luminous and anti-splinter layer advantageously contains at least one recess, opening or interruption in which the luminous unit or the positioning strip is arranged on or fastened to the inside face of the cover. Therefore, at least one oblong, strip-shaped or stripe-shaped luminous unit can be arranged, e.g., in an oblong recess. If several openings are provided, a luminous unit can be arranged in one of the openings or a luminous unit extends over several or all openings, and projections or raised areas of the particular luminous unit serve for the placing or fastening of the luminous unit or they contain the luminous unit such as, e.g., the LEDs, which radiate light into the luminous and anti-splinter layer.

The luminous and anti-splinter layer is preferably fastened on the interface of the pane or of the cover and in particular is adhered to them or laminated on them. The luminous and anti-splinter layer can be constructed in one part or in several parts. Therefore, an individual layer such as, e.g., an anti-splinter layer or a luminous and anti-splinter layer can be arranged in particular in an edge area of the cover adjacent to a large-area, central luminous and anti-splinter layer.

A shade is advantageously provided which covers the side edge of the luminous and anti-splinter layer and the luminous unit. In addition, the positioning strip can also be covered. The shade can also be formed by the positioning strip.

According to a preferred embodiment the shade is fastened on both sides of the luminous unit on the one hand outside of the luminous unit on an area of the luminous and anti-splinter layer in the vicinity of the cover edge and on the other hand inside of the luminous unit on the section of the luminous and anti-splinter layer on the inside of the cover. Therefore, the shade covers the lighting device in particular in the area in which scattered light could exit. In addition, the shade forms an optically attractive covering of the functional components arranged underneath it.

It is especially preferred if the cover comprises a cover frame on the edges and if the positioning strip with the luminous unit is adjacently attached inward from the cover and that a shade is adhered on the one hand via the luminous and anti-splinter layer to the inside face of the pane and on the other hand is firmly connected to the cover frame. The shade, which is, e.g., a component consisting of solid plastic, can transfer traction forces in the transverse direction from its fastening to the luminous and anti-splinter layer on the inward cover side to its fastening of the outside of the cover. Such traction forces can occur, for example, if in the case of an accident a vehicle passenger strikes against the pane and this pane splinters, wherein a tractive stress occurring on the luminous and anti-splinter layer which loads the luminous and anti-splinter layer to the middle of the cover can be transmitted via the shade and it particular fastening.

Accordingly, the shade covers the luminous unit and can be fastened toward the cover middle on the luminous and anti-splinter layer and toward the outer edge of the cover on the luminous and anti-splinter layer attached to the inside face of the pane or to a cover frame on the pane edge side.

The pane, on whose inside face of the pane the luminous and anti-splinter layer is fastened and is in particular adhered or laminated on, preferably forms the cover of the vehicle roof, which closes a roof opening of the vehicle roof.

BRIEF DESCRIPTIONS OF THE DRAWINGS

The invention is explained in detail in the following using exemplary embodiments of a cover according to the invention with reference made to the drawings. In the drawings:

FIG. 4 shows a cross-sectional view in a schematic representation of an edge area of the cover pane with an embodiment of the arrangement of the irradiation of light into the luminous and anti-splinter layer;

FIGS. 5 to 18 show a cross-sectional view according to FIG. 4 of other exemplary embodiments of the arrangement of the irradiation of light into the luminous and anti-splinter layer and its fastening to the cover;

DETAILED DESCRIPTION

Figure 3:
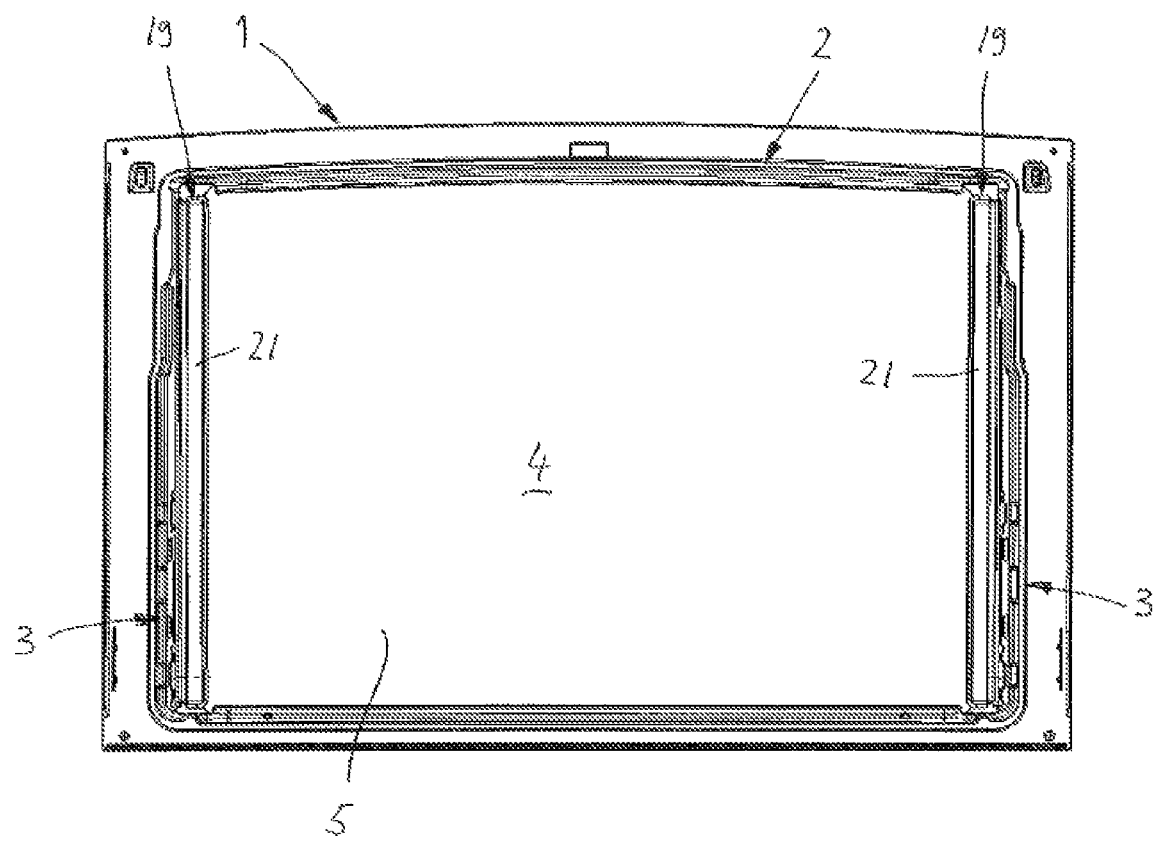
FIG. 3 shows a top view of the cover arranged in a roof opening.

A vehicle such as, e.g., a passenger car comprises a vehicle roof 1 with a roof opening 2 (see FIG. 3) in which a cover 4 which is movably supported by a support device 3 on the vehicle roof 1 is arranged in the closed position. The cover 4 comprises a pane 5 of glass or plastic. The cover 4 comprises a luminous and anti-splinter layer 6 on its inner side or lower side and which is placed on the inside cover surface or the inside 7 of the cover or of the pane and is, e.g., adhered on or laminated on in a planar manner. The luminous and anti-splinter layer 6, which can be formed by a luminous and anti-splinter sheet, also constitutes a luminous layer.

Figure 2:
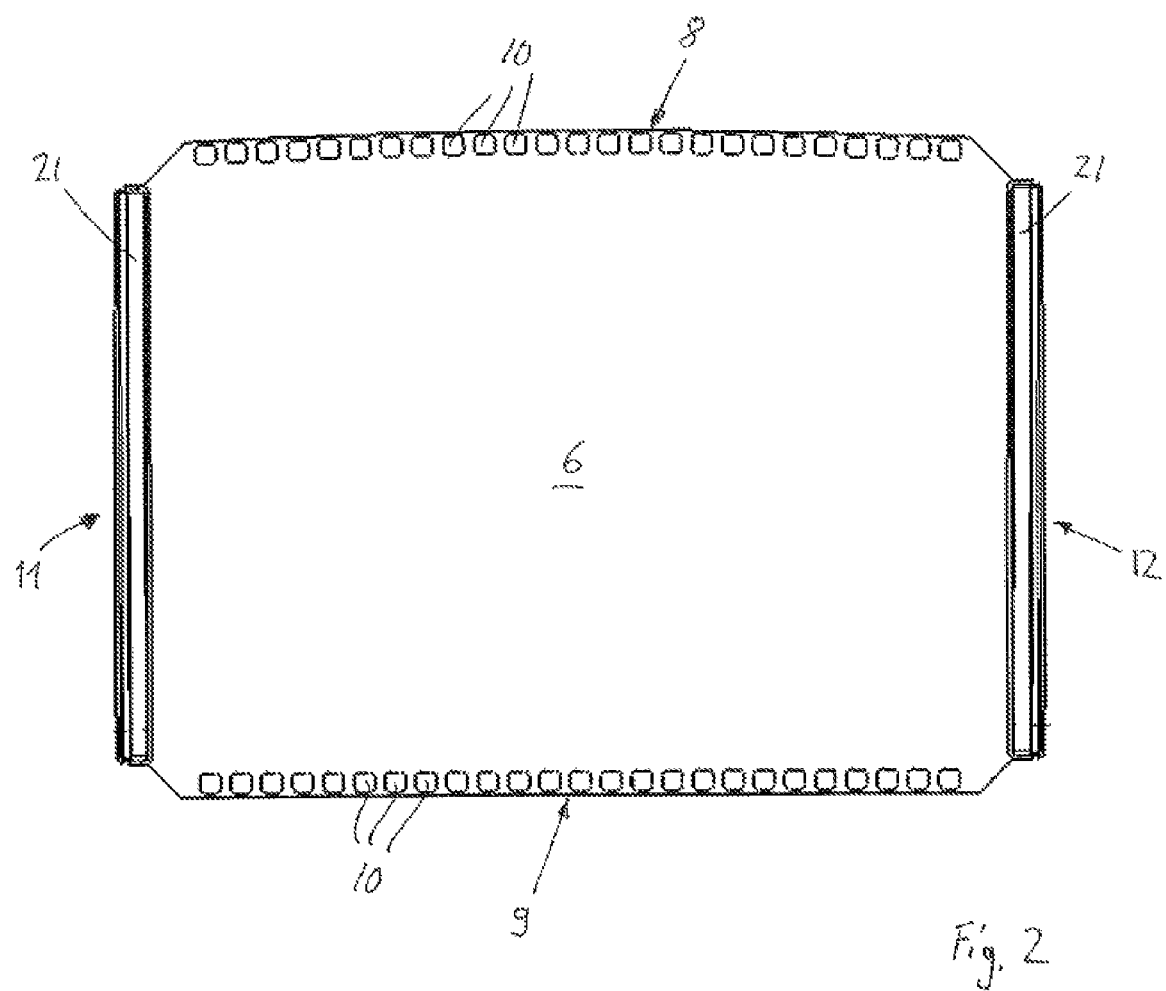
FIG. 2 shows a top view of the luminous and anti-splinter layer which can be attached to an interface of the pane with a lateral coupling in of light.

The luminous and anti-splinter layer 6 is formed at least on its front edge 8 (see FIG. 2) and on its back edge 9, which is associated with the associated front edge and back edge of the cover 4, with a series of openings 10 or perforations along these edges 8, 9 by which an additional secure fastening of the luminous and anti-splinter layer 6 can take place on the inner cover surface and on a frame-like inner cover sheet or in the case of a fixed vitrification on the roof section frame of the body, e.g. during a forming around the edges or the adhering of the cover 4 to the luminous and anti-splinter layer 6 attached to it.

Figure 1:
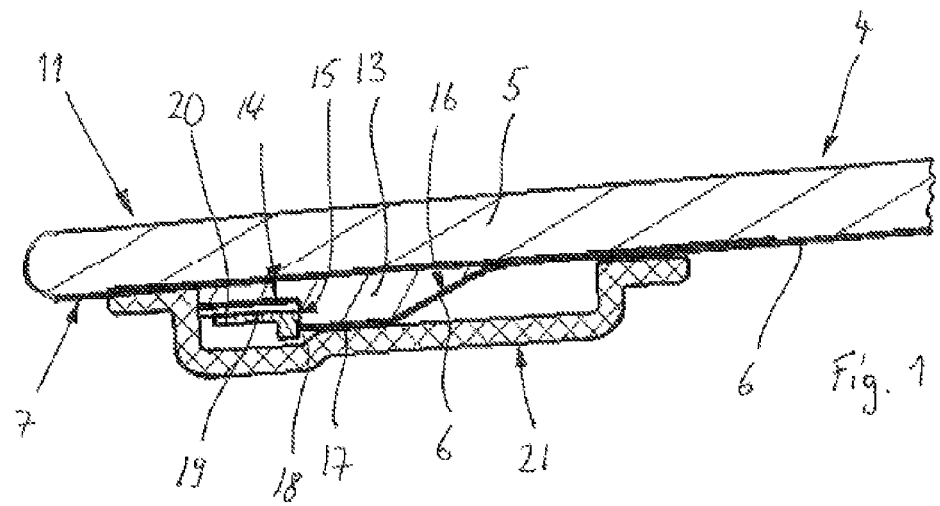
FIG. 1 shows a cross-sectional view of an edge area of a pane of a cover of a vehicle roof with a luminous and anti-splinter layer and a lateral coupling in of light.

A positioning strip 13 like a longitudinal band is attached to the left and the right, relative to the arrangement of the cover 4 in its closed position on the vehicle roof, longitudinal edge or side edge 11 or 12 of the cover 4 or of the pane 5 to the inside face 7 of the pane (see FIG. 1). The positioning strip 13 comprises an offset 14 in the direction of the side edge 11 of the cover and with a front wall 15. From the front wall 15, the surface of the positioning strip 13 runs in the direction toward the middle of the cover (to the right in FIG. 1) and runs on an, e.g., wedge-shaped section of the positioning strip 13 in an oblique or inclined transitional surface 16 in the direction toward the middle of the cover. The luminous and anti-splinter layer 6 is attached in its edge area 17 onto the transitional surface 16 and extends up to the front wall 15 of the offset 14 and ends in a section surface or end surface parallel to the front wall 15 which forms the irradiation edge 18.

A luminous unit 19, in particular an LED luminous unit which comprises, e.g., a flexband or a PCB board, is fastened, e.g., by an adhesive band 20 to the offset 14. The flexband or the PCB board carries a plurality of LEDs or micro-LEDs arranged in a row and which are attached with the aid of the flexband or of the PCB board directly to the section surface or end surface or the irradiation border 18 of the luminous and anti-splinter layer 6 in such a manner that light emitted by them is irradiated into the luminous and anti-splinter layer 6. The thickness or structural height of the positioning strip 13 is determined by the structural height of the flexband or of the PCB boards with the LEDs and of the positioning space required for this. The transitional surface 16 serves to create a gentle, soft, bend-free transition of the luminous and anti-splinter layer 6 from the inside face 7 of the pane to the end position on the front wall 15 of the offset 14.

The luminous and anti-splinter layer 6 has, in addition to its function of passenger protection in the case of splintering glass, also the function of lighting in that it radiates the irradiated light via its surface into the inner compartment of the vehicle. Light is irradiated on the two side irradiation edges 18 of the luminous and anti-splinter layer 6 through the two light devices or illumination units 19 on the edges.

A shade 21 covers the positioning strip 13 with the LED luminous unit 19 attached to it. The shade 21 is fastened, e.g., on both sides adjacent to the positioning strip 13 on the inside face 7 of the cover or of the pane or is fastened on the luminous and anti-splinter layer 6. Therefore, the shade 21 protects against scattered light exiting from the light irradiation and improves the optical impression of the cover bottom for vehicle passengers.

The LEDs or micro-LEDs have a light emergence of e.g. 0.8 mm and the luminous and anti-splinter layer 6 has a thickness of, e.g., 0.15 mm to 0.75 mm and in particular approximately 0.2 mm to 0.5 mm. The LEDs can be coupled with the aid of a coupling means to the luminous and anti-splinter layer 6 as a result of which the irradiation of light can take place with lesser losses and therefore in an improved manner. A coupling means is, e.g., a transparent adhesive or the like.

FIGS. 4 to 16 show the side edge area of the pane 5 with the arrangement of the LED luminous unit 19. The luminous and anti-splinter layer 6 and the luminous and anti-splinter sheet are abbreviated in the following as splinter protection layer.

In the case of the pane 5 of FIG. 4 a positioning strip 13 is attached to the cover bottom or pane bottom or inside pane side 7 which strip comprises, in the direction of the pane edge, a level upper side parallel to the base on which upper side the LED luminous unit 19 is fastened, and comprises an oblique or inclined transitional surface 16 running toward the pane middle and on a wedge-shaped section of the positioning strip 13 on which the splinter protection layer 6 is fastened by its edge area 17. The LED luminous unit 19 borders directly on the irradiation edge 18 of the splinter protection layer 6, which border is formed by the sectional surface or end surface, so that the LEDs 29 of the LED luminous unit 19 can directly radiate into the splinter protection layer 6.

In the case of the pane of FIG. 5 the LED luminous unit 19 is fastened by the adhesive layer 20 on the cover bottom or pane bottom 7. The positioning strip 13 is formed exclusively as a wedge with the inclined transitional surface 16 and is attached on the inward side of the cover directly adjacent to the LED luminous unit 19. The splinter protection layer 6 is fastened by its end area on the transitional surface 16 of the positioning strip 13 and is therefore brought onto an irradiation level associated with the LED luminous unit 19.

FIG. 6 shows a pane 5 in which the LED luminous unit 19 is attached to the inside face 7 of the pane and the splinter protection layer 6 is fastened on the inside face 7 of the pane and is adjacent to the irradiation edge 18.

In the case of the pane 5 of FIG. 7 the splinter protection layer 6 is also attached by its edge area 17 in a planar manner on the inside face 7 of the pane. A positioning strip 13 is adhered on the inside face 7 of the pane laterally adjacent to the edge of the splinter protection layer 6. The positioning strip 13 comprises a holding shank 22 which holds the LED luminous unit 19 in the correct position on the irradiation edge 18 of the splinter protection layer 6. The LED luminous unit 19 can only be clamped or it is firmly adhered by an adhesive layer 23 on the holding shank 22 of the positioning strip 13 and/or the inside face 7 of the cover.

In the case of the pane of FIG. 8 the splinter protection layer 6 is also attached in a planar manner by its end area on the inside face 7 of the pane. The LED luminous unit 19 is adhered at a slight distance from the irradiation edge 18 of the splinter protection layer 6. An optical element 23 connects the LED luminous unit 19 to the splinter protection layer 6 and improves the irradiation of light emitted from the LEDs 29. The optical element 23 is, e.g., a transparent plastic with which the distance is filled out or lined. The plastic of the optical element 23 conducts the light to the splinter protection layer 6 and reduces light scatter losses.

The pane of FIG. 9 is a modification of the pane of FIG. 8, wherein the splinter protection layer 6 comprises an irradiation edge 18 beveled like a wedge and the distance between the splinter protection layer 6 and the LED luminous unit 19 is filled out with the optical element 23. In addition to the LED luminous unit 19, a second LED luminous unit 19' is provided which is arranged on the optical element 23, wherein the LEDs 29 of the two LED luminous units 19, 19' are arranged in particular offset from one another. Based on the two LED luminous units 19 and 19', the irradiation of light can be significantly increased. The second LED luminous unit 19' can be fastened during the casting of the optical element 23 by the latter or is held by a holder which is not shown.

The pane 5 of FIG. 10 comprises, compared to the pane of FIG. 9, a changed arranged of the second LED luminous unit 19' with a correspondingly altered direction of the emitting of light. The optical element 23 is accordingly designed to be larger.

In the case of the pane 5 of FIG. 11 the splinter protection layer 6 is also attached in a planar manner with its edge area 17 on the inside face 7 of the pane. The splinter protection layer 6 contains several recesses or holes 24 in the vicinity of its edge area 17 and parallel to its irradiation edge 18 in which LED luminous units 19 are arranged.

Figure 12:
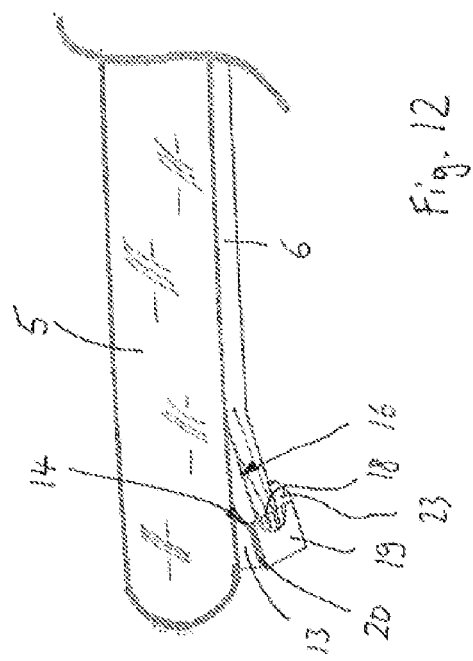

In the case of the pane 5 of FIG. 12 a positioning strip 13 is attached to the inside face 7 of the pane and comprises a wedge-shaped section directed towards the pane center and with an inclined transitional surface 16 and comprises an offset 14 for fastening the LED luminous unit 19. The fastening surface of the offset 14 is aligned parallel to the inclined transitional surface 16 and the irradiation edge 18 of the splinter protection layer 6 is aligned vertically to the transitional surface 16 so that the LEDs 29 can radiate their light in the optimal alignment into the splinter protection layer 6. An optical element 23 such as, e.g., a cast resin strand can improve the introduction of light and reduce scattered light.

Figure 14:
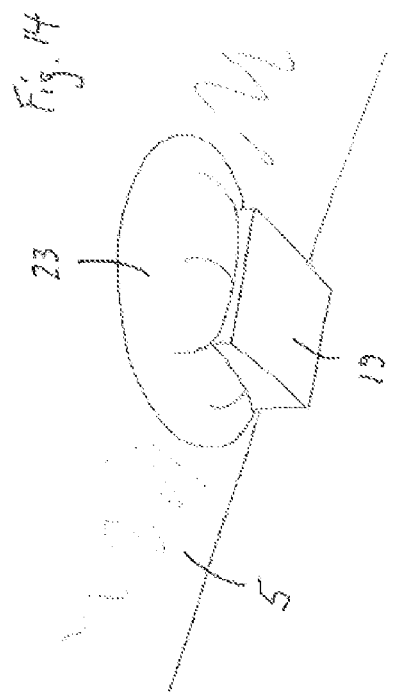
Figure 13:
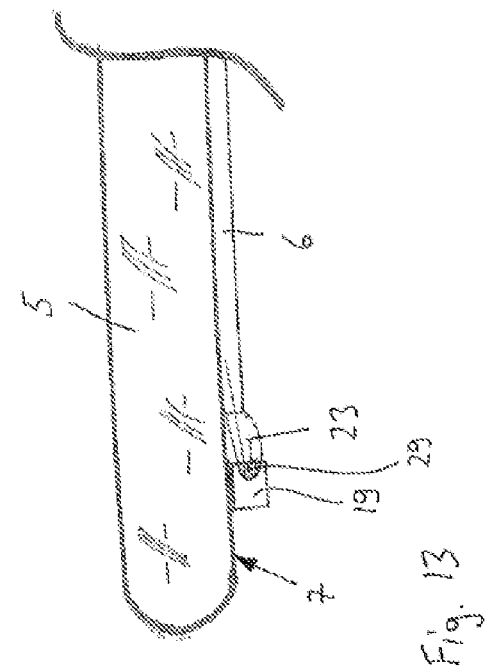

The pane 5 of FIG. 13 comprises a coupling of the LED luminous unit 19 to an optical element 23 according to FIG. 8. FIG. 14 shows a three-dimensional top view of the LED luminous unit 19 with cast resin as optical element 23.

Figure 15:
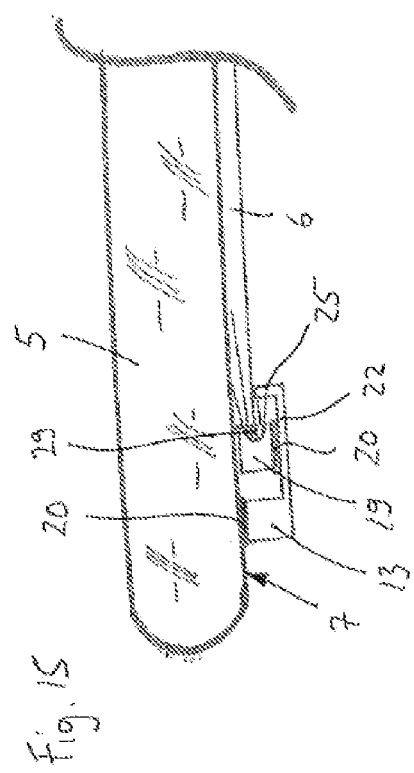

The pane 5 of FIG. 15 modifies the arrangement of the pane 5 of FIG. 7 in such a manner that the holding shank 22 of the positioning strip 13 is lengthened toward the splinter protection layer 6 and rests with a contact web 25 on the surface of the splinter protection layer 6. Therefore, the positioning strip 13 extends completely over the LED luminous unit 19 and forms a light-tight encapsulation of the LED luminous unit 19 in the manner of a shade.

In the case of the pane 5 of FIG. 16 a positioning strip 13 is provided which constitutes a U-shaped, shade-like covering profile and comprises a slot 26 which is formed on the shank 28 of the positioning strip 13 directed toward the pane middle and through which the edge area of the splinter protection layer 6 extends. The slot 26 is distanced from the inside face 7 of the pane in such a manner that the edge area of the splinter protection layer 6 is lifted off from the inside face 7 of the pane and the irradiation edge 18 is correctly associated with the LEDs 29 of the LED luminous unit 19.

In the case of the pane 5 of FIG. 17 the positioning strip 13 is constructed as a hollow profile in which the LED luminous unit 19 is arranged and is fastened by an adhesive layer 20 in such a manner that the LEDs 29 beam their light in the direction of a slot 27 in the hollow profile through which the edge area of the splinter protection layer 6 is inserted. The irradiation edge 18 lies in a planar manner on the LEDs 29. The splinter protection layer 6 is not adhered in its further edge area on the inside face 7 of the pane so that the positioning strip 13 can be positioned at a distance from the inside face 7 of the pane in such a manner that the splinter protection layer 6 can run bent downward at an angle of approximately 90° from the interface 7 of the cover.

The positioning strip 13 can be formed for positioning it on the cover 4, e.g., on a PU frame of the pane 5.

In the case of the pane 5 of FIG. 18 an LED luminous unit 19 is directly fastened adjacent to a wedge-shaped positioning strip 13 to the inside face 7 of the cover. The splinter protection layer 6 is attached to the inclined transitional surface 16 of the positioning strip 13 and directly borders on the LEDs 29. A positioning or covering strip is formed as shade 21 similar to the positioning strip 13 of FIG. 15 but has two adjacently running contact webs 25 which improve the light-tight covering.

The panes shown in the FIGS. 4 to 18 can also contain shades which cover the LED luminous units 19 and the positioning strips 13.

Figure 19:
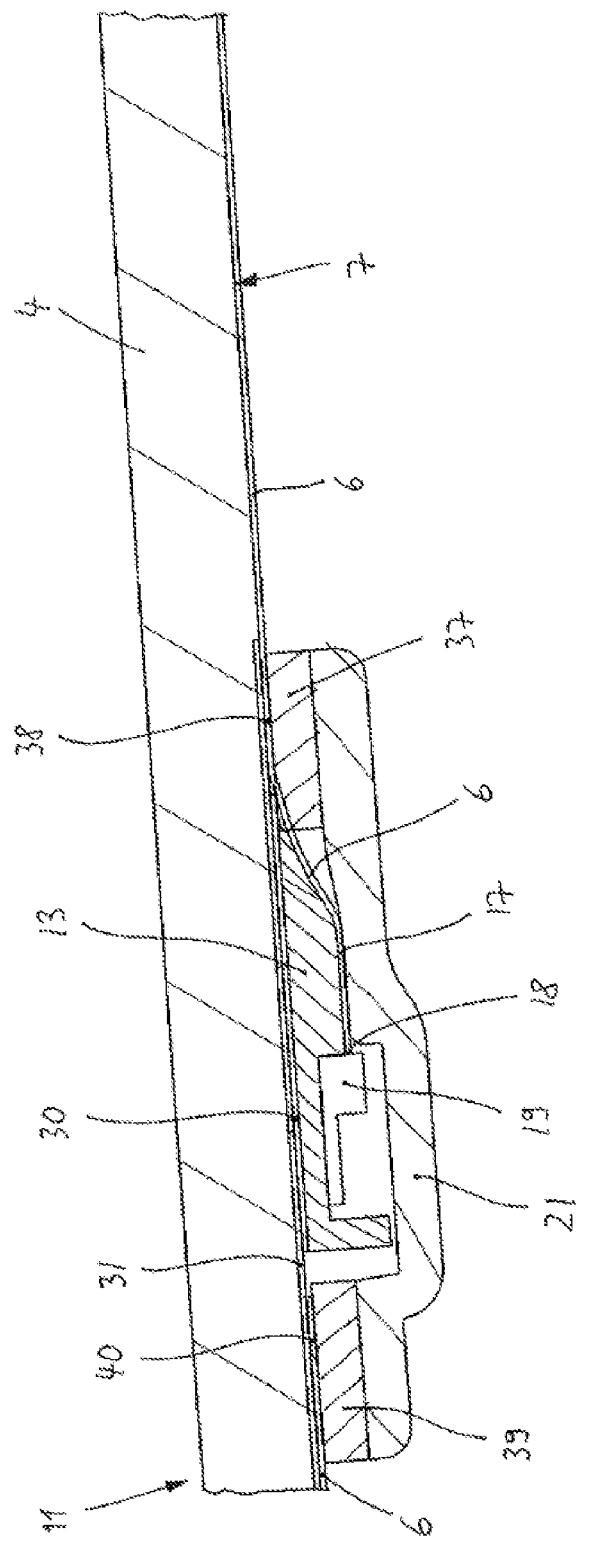
FIG. 19 shows a cross-sectional view according to FIG. 1 of another exemplary embodiment of the arrangement of the irradiation of light into the luminous and anti-splinter layer and its fastening to the cover.
Figure 20:
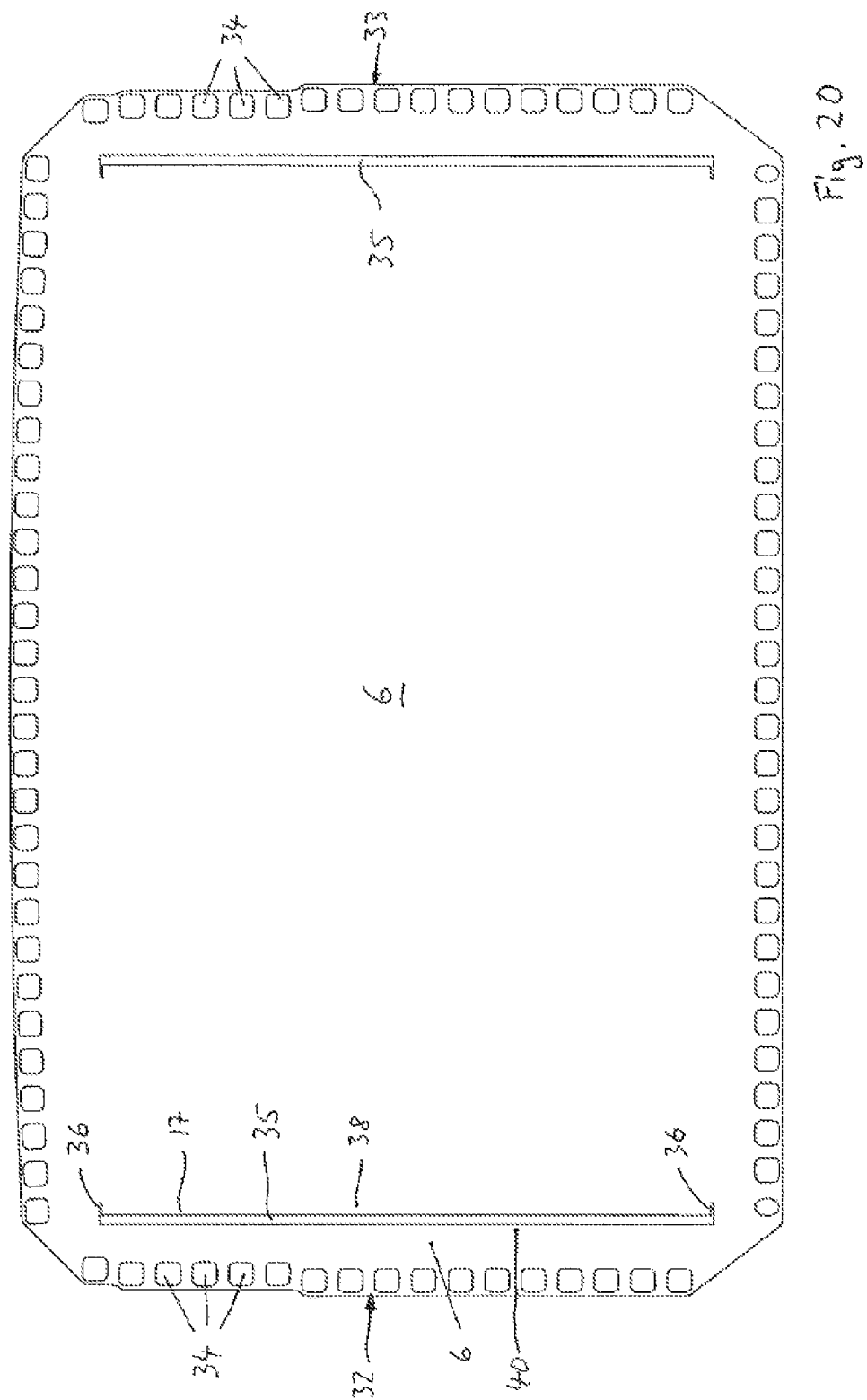
FIG. 20 shows a top view according to FIG. 2 of the luminous and anti-splinter layer of the exemplary embodiment of FIG. 19.

In the exemplary embodiment shown in the FIGS. 19 and 20 the positioning strip 13 is fastened by an adhesive layer or an adhesive band 30 on a glass frit 31 formed, e.g., as black printing and which is arranged on the inside face 7 of the cover or the pane along the side edge 11 at such a width in the transverse direction of the pane that it completely covers the arrangement comprising the LED luminous unit 19, the positioning strip 13 and the shade 21 up to the transparent pane 5.

The associated luminous and anti-splinter layer 6 (see FIG. 20) contains on its left side edge 32 and on it opposed right side edge 33 a series of openings 34 or perforations corresponding to the openings 10 on its front edge 8 and back edge 9 by which an edge foaming placed on the cover 4 or the pane 5 can bring about an additional, reliable fastening of the luminous and anti-splinter layer 6 on the inside cover surface or inside pane face 7 and—if present—on a cover frame or a frame-like inside cover sheet.

The luminous and anti-splinter layer 6 furthermore contains an oblong recess 35 inward from the particular side edge 32 and 33 and parallel to the latter, which recess is formed in the length of the associated positioning strip 13 and the LED luminous unit 19. The luminous and anti-splinter layer 6 contains two transverse separating sections 36 on these two ends of the oblong recess 35 which sections separate the edge area 17 of the luminous and anti-splinter layer 6 at these two ends from the luminous and anti-splinter layer 6 so that this edge area 17 can be placed on the positioning strip 13 and be fastened to it (according to the first exemplary embodiment shown in FIG. 1).

The shade 21, which is manufactured, e.g., from a plastic, is fastened on the one hand by an adhesive band or foamed adhesive band 37 to an inner strip section 38 of the luminous and anti-splinter layer 6 to which it is firmly connected inwardly from the positioning strip 13 to the pane 5, and is fastened on the other hand to an adhesive band or foamed adhesive band 39 to an outer strip section 40 of the luminous and anti-splinter layer 6 to which it is firmly connected outwardly from the positioning strip 13 to the pane 5.

The two adhesive bands or foamed adhesive bands 37 and 39 hold the shade 21 very firmly by its adhesive connections on the luminous and anti-splinter layer 6 and therefore on the pane 5. If a vehicle passenger should strike the pane 5 and splinter it during an accident, a tractive stress which occurs on the luminous and anti-splinter layer 6 and which loads the luminous and anti-splinter layer 6 inwardly from the positioning strip 13 toward the cover middle is transferred by the shade 21 and the two adhesive bands or foamed adhesive bands 37 and 39 onto the outer strip section 40 of the luminous and anti-splinter layer 6. This outer strip section 40 of the luminous and anti-splinter layer 6, which section is fastened especially firmly on the pane 5 in this area bordering on the edge foaming on the recesses 34, therefore increases the tear resistance of the luminous and anti-splinter layer 6 firmly connected on the pane 5.

Figure 21:
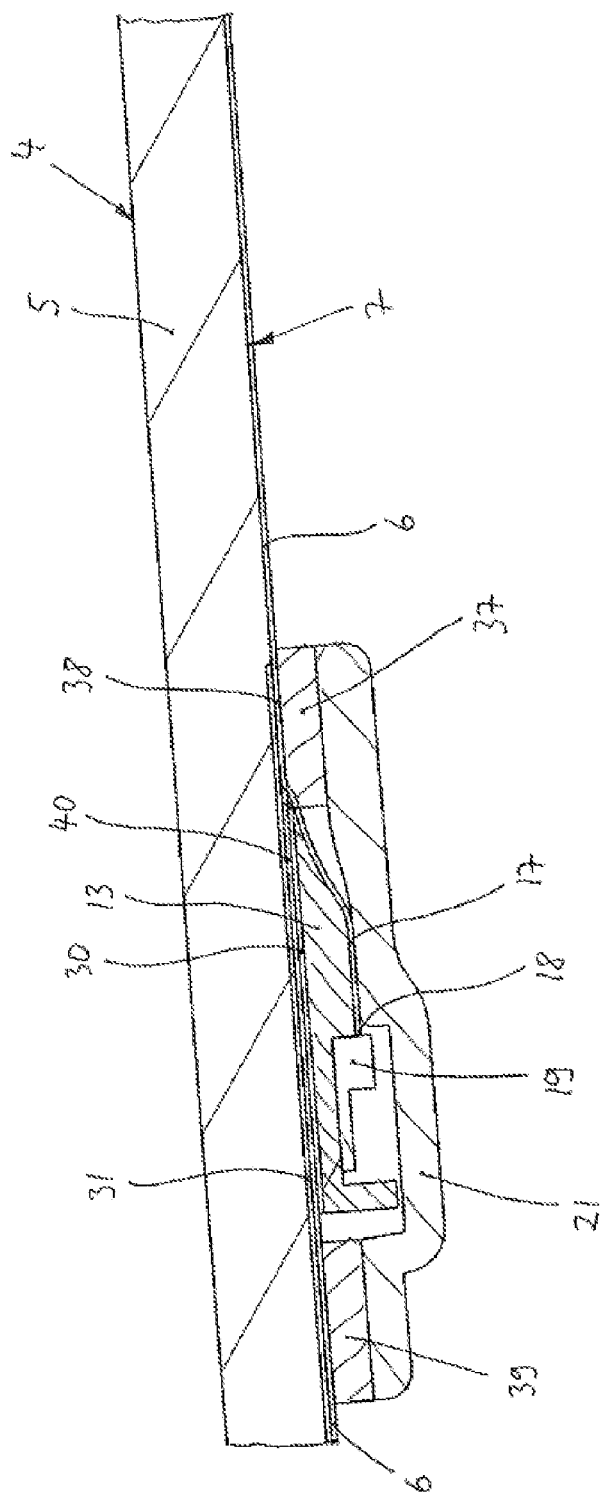
FIG. 21 shows a cross-sectional view according to FIG. 1 of another exemplary embodiment of the arrangement of the irradiation of light into the luminous and anti-splinter layer and its fastening to the cover.
Figure 22:
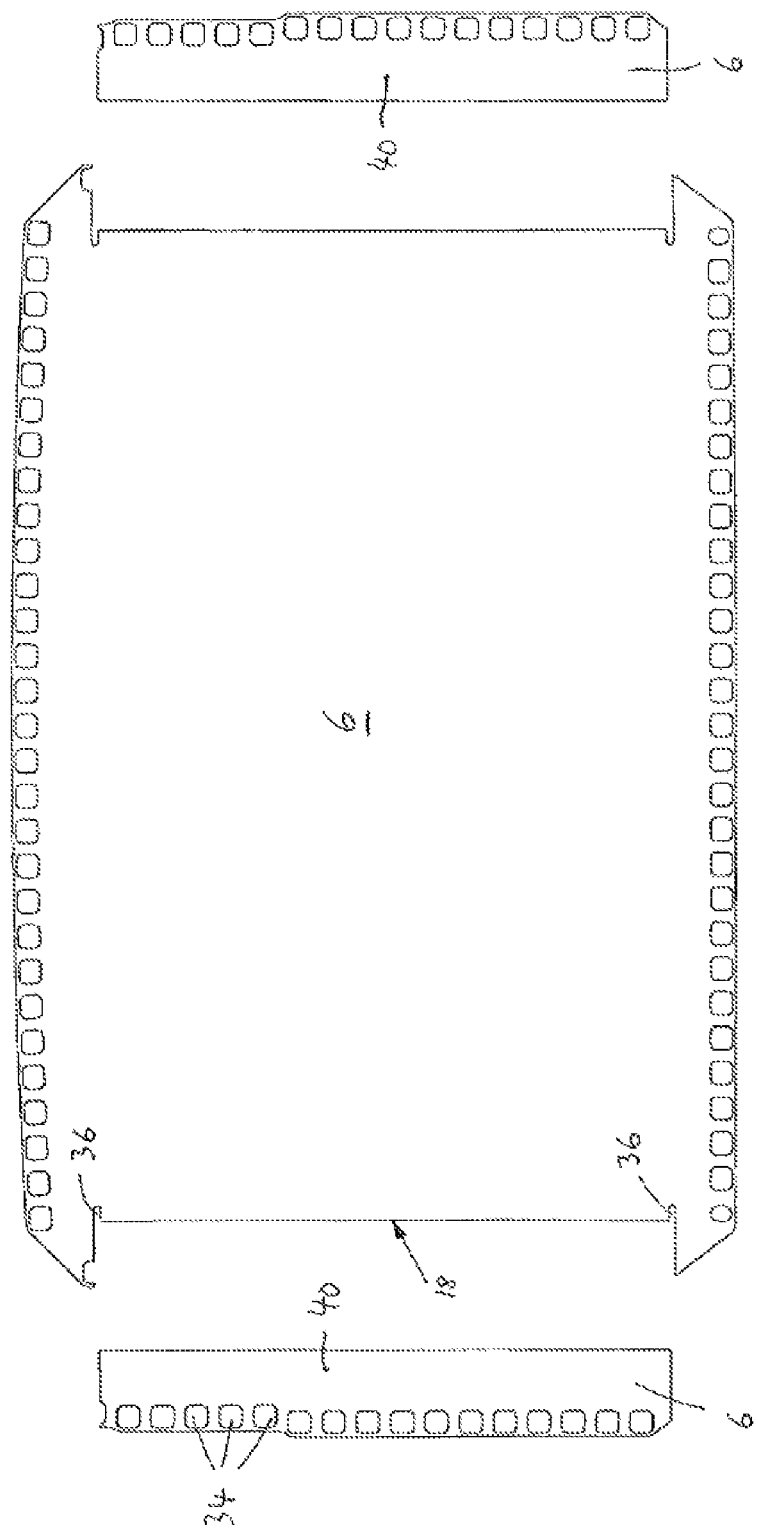
FIG. 22 shows a top view according to FIG. 2 of the luminous and anti-splinter layer of the exemplary embodiment of FIG. 21.

The exemplary embodiment shown in the FIGS. 21 and 22 is a modification of the exemplary embodiment shown in FIGS. 19 and 20. The outer strip section 40 of the luminous and anti-splinter layer 6 is wider in the transverse direction or y direction than the outer strip section 40 shown in the FIGS. 19 and 20 and is placed on the inside face 7 of the pane, for example in the area of the glass frit 31, in such a manner that it forms an intermediate layer in the fastening of the positioning strip 13 by the adhesive band 30. The outer strip section 40 is fastened or adhered over its comparatively large surface to the pane 5 in such a manner that it is very difficult to pull it off. The shade 21 is therefore connected by the outer foamed adhesive band 39 and the outer strip section 40 to the pane 5 in such a manner that it is very difficult to pull it off.

This outer strip section 40 can be, e.g., a part which is separated from the luminous and anti-splinter layer 6 provided for attachment on the pane 5 or is an independent part.

Figure 23:
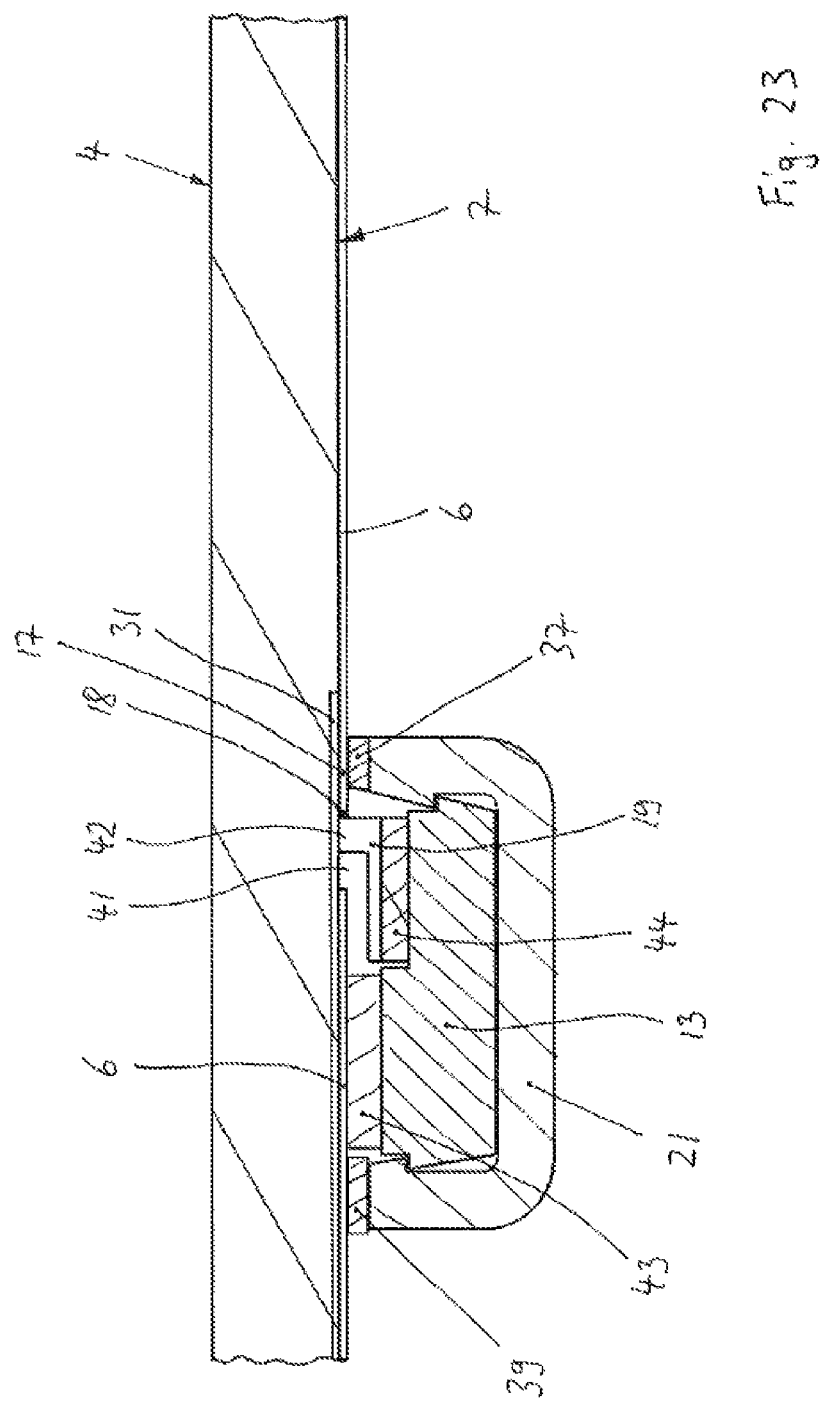
FIG. 23 shows a cross-sectional view according to FIG. 1 of another exemplary embodiment of the arrangement of the irradiation of light into the luminous and anti-splinter layer and its fastening to the cover.
Figure 24:
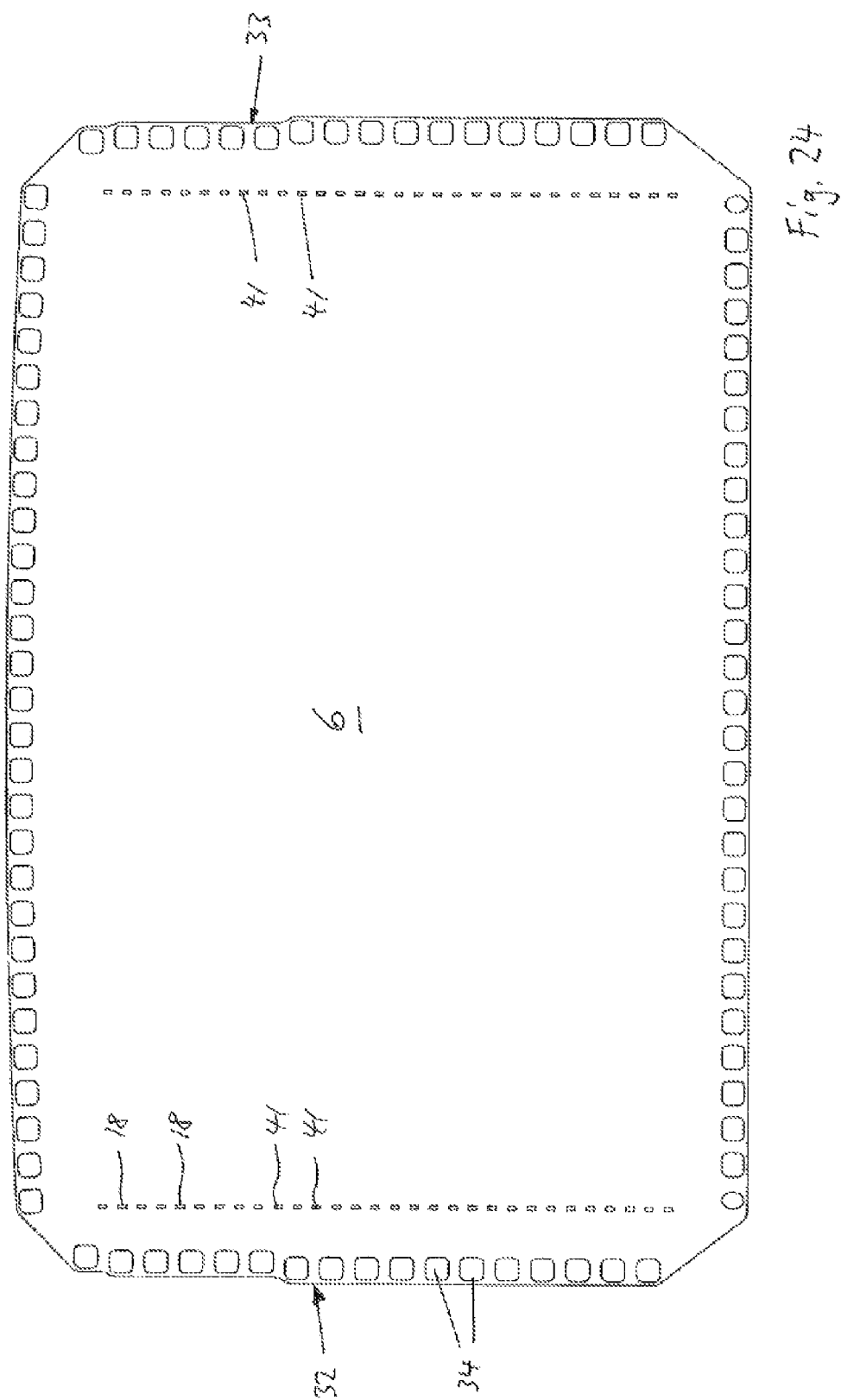
FIG. 24 shows a top view according to FIG. 2 of the luminous and anti-splinter layer of the exemplary embodiment of FIG. 23.

In the exemplary embodiment shown in the FIGS. 23 and 24 the luminous and anti-splinter layer 6 is formed with a plurality of small holes or openings 41 which are arranged spaced from each other in a row parallel to the left side edge 32 as well as to the right-side edge 33. The band-shaped or strip-shaped LED luminous unit 19 of the lighting device is arranged lying in such a manner on the inside face 7 of the pane by projections 42 which project against the inside face 7 of the pane, are associated with the openings 41 and which contain the LEDs 29, that the luminous and anti-splinter layer 6 directly borders on these projections 42 and the light can be radiated into the particular irradiation edge 18 of the luminous and anti-splinter layer 6 at its openings 41.

The fastening of the LED luminous unit 19 takes place by a positioning strip 13 which is adhered by a first foamed adhesive band 43 on the luminous and anti-splinter layer 6 in the direction of the left side edge 32 adjacent to the LED luminous unit 19 and extends over the LED luminous unit 19 in an inwardly adjacent manner and is firmly connected to the latter by a second foamed adhesive band 44. The positioning strip 13 holds the LED luminous unit 19 firmly against the inside face 7 of the cover by its firm adhesion to that of the luminous and anti-splinter layer 6 and therefore on the inside face 7 of the cover, wherein the LED luminous unit 19 is not provided with its own adhesion, nor is one necessary. A shade 21 covers the positioning strip 13 with the LED luminous unit 19 and is fastened in accordance with the embodiment described in FIG. 19 to the pane 5 by two foamed adhesive bands 37, 39 via the luminous and anti-splinter layer 6.

Figure 25:
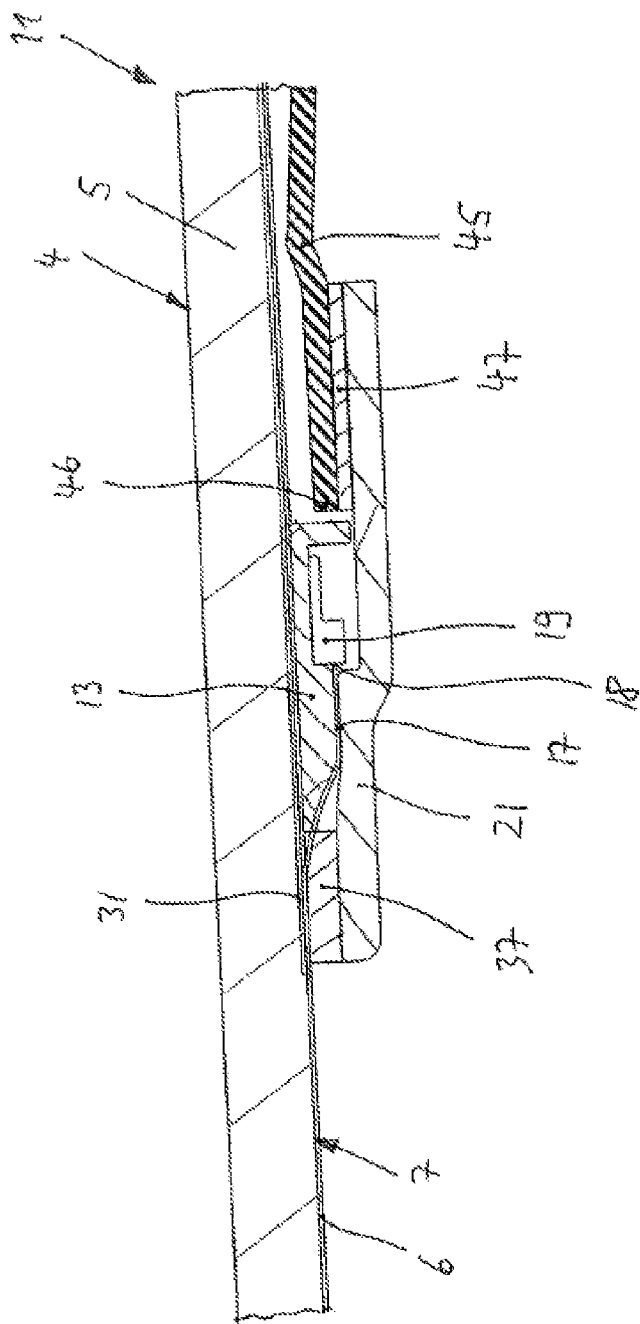
FIG. 25 shows a cross-sectional view according to FIG. 1 of another exemplary embodiment of the arrangement of the irradiation of light into the luminous and anti-splinter layer and its fastening to the cover.

In the exemplary embodiment shown in FIG. 25 the cover 4 or the pane 5 comprises a cover frame 45, in particular a frame-like inside cover sheet which is fastened on the pane 5 at least in the vicinity of its side edge 11 on the inside or lower side, e.g., by foaming. A positioning strip 13 with an LED luminous unit 19 attached to it is arranged and fastened inwardly adjacent to an inner edge 46 of the cover frame 45 in a manner according to the exemplary embodiment shown in FIG. 19. A shade 21 covering the positioning strip 13 with the LED luminous unit 19 attached to it is fastened on the one hand by an inner foamed adhesive band 37 to the strip section 38 of the luminous and anti-splinter layer 6 and on the other hand is firmly connected to the adjacent cover frame 45, e.g., by a foamed adhesive band 47, by PU adhesive, by an acrylic adhesive band or by other types of adhesives. The shade 21 is therefore fastened to the cover frame 45 in the case of tractive loading in the direction of the cover middle (such as in the case of an accident with an impact by a vehicle passenger, see above explanations) and is kept from shifting by this cover frame.

Basically, every one of the lighting devices shown in the FIGS. 4 to 18 can also be used on a cover 4 with such a cover frame 45 instead of to the lighting device according to FIG. 25 and be connected to the cover frame 45 for supporting the shade 21.

The individual features of the invention disclosed in the specification in the exemplary embodiments as well as in the figures can be combined in any technically advantageous arrangements and designs with the subject matter of the invention in its general form.

List of reference numerals

| | |
|---|---|
| 1 | vehicle roof |
| 2 | roof opening |
| 3 | support device |
| 4 | cover |
| 5 | pane |
| 6 | luminous and anti-splinter layer |
| 7 | inside pane face |
| 8 | front edge |
| 9 | back edge |
| 10 | opening |
| 11 | side edge |
| 12 | side edge |
| 13 | positioning strip |
| 14 | offset |
| 15 | front wall |
| 16 | transitional surface |
| 17 | edge area |
| 18 | section- or end surface |
| 19 | LED luminous unit |
| 20 | adhesive band |
| 21 | shade |
| 22 | holding shank |
| 23 | optical element |
| 24 | hole |
| 25 | contact web |
| 26 | slot |
| 27 | slot |
| 28 | shank |
| 29 | LED |
| 30 | adhesive band |
| 31 | glass frit |
| 32 | left side edge |
| 33 | right side edge |
| 34 | opening |
| 35 | recess |
| 36 | transverse separating section |
| 37 | foamed adhesive band |
| 38 | strip section |
| 39 | foamed adhesive band |
| 40 | strip section |
| 41 | opening |
| 42 | projection |
| 43 | foamed adhesive band |
| 44 | foamed adhesive band |
| 45 | cover frame |
| 46 | inside edge |
| 47 | foamed adhesive band |

The invention claimed is:

1. A cover of a vehicle roof, comprising:
   a pane,
   an anti-splinter layer arranged on the inside face of the pane, and
   a lighting device comprising a luminous layer,
   wherein the anti-splinter layer and the luminous layer forms a combined anti-splinter luminous layer,
   wherein the lighting device contains at least one luminous unit which is provided on a side edge area of the combined anti-splinter luminous layer for radiating light into each of the anti-splinter layer and the luminous layer, and that at least one positioning strip is provided for the fastening of the at least one luminous unit and/or for the association of the at least one luminous unit to an irradiation edge of the combined anti-splinter luminous layer, wherein the combined anti-splinter luminous layer is formed by a luminous and anti-splinter sheet, which is arranged against, on or in the at least one positioning strip with its edge area containing the irradiation edge at a distance from the inside face of the pane; and wherein the at least one positioning strip is attached on the inside face of the cover, and the combined anti-splinter luminous layer is arranged on the at least one positioning strip with its edge area comprising the irradiation edge at a distance from the inside face of the cover.

2. The cover according to claim 1, wherein the combined anti-splinter luminous layer has a thickness of approximately 0.15 mm to 0.75 mm.

3. The cover according to claim 2, wherein the combined anti-splinter luminous layer is formed by the anti-splinter layer consisting of polyethylene terephthalate with a thickness of approximately 0.2 mm.

4. The cover according to claim 1, wherein the at least one luminous unit contains LEDs or micro-LEDs which are arranged on an irradiating edge of the combined anti-splinter luminous layer along the side edge of the cover.

5. The cover according to claim 1, wherein the at least one positioning strip has a receiving section on which the at least one luminous unit is brought in association with the combined anti-splinter luminous layer.

6. The cover according to claim 5, wherein the receiving section is built as an offset which extends from the irradiation edge of the combined anti-splinter luminous layer toward the side edge of the cover and on which the at least one luminous unit is arranged.

7. The cover according to claim 1, wherein the at least one luminous unit, which comprises a flexible band or a guide plate with LEDs or micro-LEDs arranged on it, is fastened by an adhesive layer or an adhesive band on the inside face of the cover or on a coating of the inside face of the cover or on the at least one positioning strip.

8. The cover according to claim 1, wherein the combined anti-splinter luminous layer comprises at least one recess or interruption in which the at least one luminous unit or the at least one positioning strip is arranged on or fastened to the inside face of the cover.

9. The cover according to claim 1, wherein the combined anti-splinter luminous layer is fastened or adhered to or laminated on the inside face of the cover.

10. The cover according to claim 1, wherein a shade covers at least the at least one luminous unit and the side edge of the combined anti-splinter luminous layer and also the at least one positioning strip.

11. The cover according to claim 10, wherein the shade is fastened on both sides of the at least one luminous unit on the one hand outside of the at least one luminous unit on an area of the combined anti-splinter luminous layer in the vicinity of the cover edge and on the other hand inside of the at least one luminous unit on a section of the combined anti-splinter luminous layer on the inside of the cover.

12. The cover according to claim 1, wherein the combined anti-splinter luminous layer has a thickness of approximately 0.2 mm to 0.5 mm.

13. The cover according to claim 12, wherein the combined anti-splinter luminous layer is formed by the anti-splinter layer consisting of polyethylene terephthalate with a thickness of approximately 0.2 mm.

14. A cover of a vehicle roof, comprising:
a pane,
an anti-splinter layer arranged on the inside face of the pane, and
a lighting device comprising a luminous layer,
wherein the anti-splinter layer and the luminous layer forms a combined anti-splinter luminous layer, and
wherein at least one positioning strip comprises an inner side or lower side with which it is arranged on the inside face of the cover and comprises an oppositely located outer side or top side for carrying the combined anti-splinter luminous layer with its edge area containing the irradiation edge at a distance from the inside surface of the cover, wherein the outer side or top side comprises a curved transitional surface which runs out in the direction of the middle of the cover in a wedge-shaped tip of the at least one positioning strip and forms a continuous fastening foundation for the combined anti-splinter luminous layer.

* * * * *